Dec. 22, 1959   H. O. SCHERENBERG ET AL   2,918,154
APPARATUS FOR CONTROLLING A MOTOR VEHICLE
Filed May 14, 1956   2 Sheets-Sheet 1

Inventors
HANS O. SCHERENBERG
HANS-JOACHIM M. FÖRSTER
BY Dicke and Craig

Dec. 22, 1959 H. O. SCHERENBERG ET AL 2,918,154
APPARATUS FOR CONTROLLING A MOTOR VEHICLE
Filed May 14, 1956 2 Sheets-Sheet 2

INVENTORS.
HANS O. SCHERENBERG
HANS-JOACHIM M. FÖRSTER

BY Dicke and Craig
ATTORNEYS

United States Patent Office 2,918,154
Patented Dec. 22, 1959

2,918,154

APPARATUS FOR CONTROLLING A MOTOR VEHICLE

Hans O. Scherenberg, Stuttgart-Heumaden, and Hans-Joachim M. Forster, Stuttgart-Bad Cannstatt, Germany, assignors to Daimler-Benz Aktiengesellschaft, Stuttgart-Unterturkheim, Germany Application May 14, 1956, Serial No. 584,810

Claims priority, application Germany May 14, 1955

8 Claims. (Cl. 192—.034)

Our invention relates to a method of and a system for controlling a motor vehicle of the type having an engine geared to wheels of the vehicle and a clutch interposed therebetween, said clutch being of the type wherein the degree of clutching or clutching limit is automatically adjustable in dependence on the actually available engine torque in such a manner that the clutching limit or maximum torque transferred by the clutch is increased with higher engine torque and decreased with lower engine torque. In this system the capability of the clutch to transfer a torque is so automatically controlled in dependence on the available motor torque that said limit rises when the motor torque increases and drops when the motor torque decreases.

It is very difficult to measure the torque actually transferred by the clutch and to control the torque produced by the engine in accordance with a selected value because rotary oscillations are liable to interfere with the operation of a torque selector. For this reason, it has been proposed prior to our invention for the purpose of controlling the clutch engagement to use, as a substitute for the motor torque, either the position of the throttle valve of the engine or the pressure in the intake manifold as the controlling factor. These prior systems, however, failed to operate in a satisfactory manner because in certain conditions of operation of the vehicle the actual engine torque is improperly derived, for instance where the transmission is shifted to a lower speed ratio when the throttle valve is opened but a little and the engine is rotating at a high speed. Under this condition of operation it happens frequently that while prior to the gear-shifting operation the engine was driving the vehicle after the gear-shifting operation the vehicle is driving the engine with a lower speed ratio of the transmission. The engine is being accelerated by the vehicle and a powerful shock occurs when the clutch is engaged. It is the object of the present invention to eliminate such shock.

The invention resides essentially in that the clutch engagement is controlled by detecting means which are associated with the driving system and are adapted to detect the direction of the torque which depends on whether the engine drives the vehicle or is driven by the coasting vehicle. The control of the clutch by such detecting or measuring means may be such that the maximum torque that may be transferred by the clutch slightly exceeds the maximum engine torque and that the minimum of the torque that can be transferred by the clutch slightly exceeds the maximum coasting torque of the engine. The term "coasting torque" as used hereinafter relates to the torque transferred from the wheels of the vehicle to the engine under certain conditions of operation, such as coasting. Preferably, the control of the clutch is so effected that for the entire duration of the coasting condition the clutch is so adjusted that it is capable of transferring said minimum torque which slightly exceeds the coasting torque.

Further objects of our invention will appear from a detailed description of a number of preferred embodiments of the invention following hereinafter with reference to the accompanying drawings. It is to be understood, however, that the terms and phrases used in such detailed description have been chosen for the purpose of illustrating the invention rather than that of restricting or limiting same.

In the drawings:

Figure 3 shows the clutch arranged between the engine and the vehicle wheels and the electrical control thereof according to the present invention.

The driving system of the motor vehicle is composed of an engine 1 and of a train of power transferring elements gearing the engine to the wheels of the vehicle. This train of power transferring elements includes a clutch of the type which will slip when the torque transferred tends to exceed an adjustable limit. As such clutches are well known in the art and do not form part of the present invention, the clutch itself is not illustrated. For the purpose of detecting the direction of the torque and for measuring its magnitude, at least one element of the driving system, such as the engine itself, may be resiliently mounted on the vehicle for a displacement commensurate with the torque and the measuring means are responsive to such displacement. In the embodiment shown, the lower portion of the crank case 3 of the engine is resiliently connected by a rubber element 4 to a frame member 5 of the vehicle.

Figure 1:
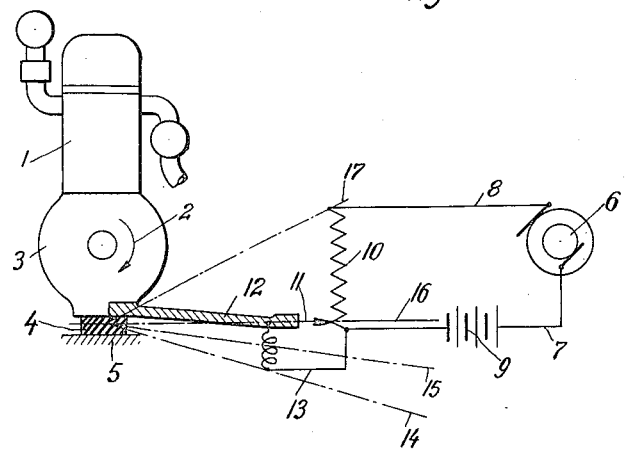
Fig. 1 illustrates a continuously operating electrical control of the clutch engagement with means detecting and measuring the engine torque, said measuring means being responsive to displacement of an element of said driving system which is resiliently mounted in the vehicle.

The clutch engagement may be controlled by auxiliary means of electrical, electromagnetical, hydraulic or pneumatic nature. In the embodiment shown, the clutch 6 is adapted to be controllled electromagnetically in dependence on the condition of operation of the vehicle. The control means are supplied with the controlling current from a source 9 through wires 7 and 8. The clutch is a type which will slip when the torque transferred tends to exceed an adjustable limit, such limit being adjustable by suitable control of the current supplied through the wires 7 and 8 to the clutch 6. In the embodiment illustrated in Fig. 1 such control of the clutch engagement is effected continuously by means of a rheostat 10 having a slidable contact 11. This contact constitutes a movable element which is connected with the torque measuring means for movement thereby. In the embodiment shown the measuring means is constituted by an arm 12 connected to the engine 1. This arm 12 by its angular position measures the magnitude and the direction of the engine torque. A flexible cable 13 connects the slidable contact 11 with the source of current 9 directly. Therefore, the current and the consequent critical torque limit of the clutch 6 will rise substantially continuously as the slidable contact 11 moves upwardly from the position shown in Fig. 1 thus progressively short-circuiting the rheostat 10.

The lines 14, 15, 16 and 17 designate characteristic angular positions of the slidable contact 11 corresponding to different torques produced by or acting on the engine. When the slidable contact 11 has the position designated by the line 14, the motor 1 is subjected to a coasting torque tending to brake the vehicle. A minimum current is supplied to the clutch 6 through the entire length of the rheostat 10. The line 15 designates the zero position of the engine in which the torque produced thereby or acting thereon amounts to zero. When the slidable contact is on the line 16, the motor produces a medium torque of the same magnitude as the coasting torque designated by the line 14. The minimum of the torque which the clutch is capable of transferring remains substantially constant between the lines 14 and 16 of the movable contact 11 and varies from the line 16 continuously up to the maximum as the resistance produced by the rheostat is continuously decreased with the movable contact 11 approaching the line 17. When this line is reached, the motor produces its full driving torque.

Preferably, the energization of the clutch 6 is so coordinated to the different positions of the wiper contact 11 that the maximum engine torque coordinated to the line 17 is slightly exceeded by the maximum torque which the clutch 6 may transfer without slippage when the wiper is in its upper most position and that lowest critical slippage limit of the clutch torque slightly exceeds the maximum coasting torque designated by line 14.

Figure 2:
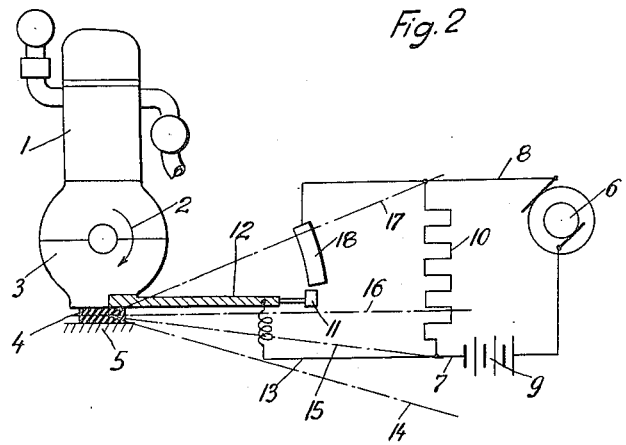
Fig. 2 shows a control system similar to that of Fig. 1, but differing therefrom in that it does not act continuously but stepwise.
Figure 2:
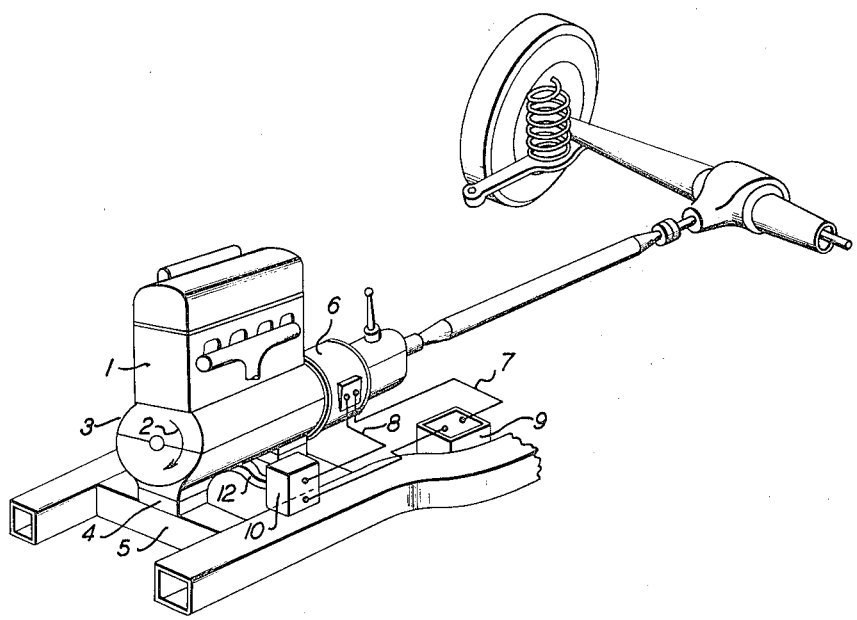

In Fig. 2 we have illustrated a slightly modified controlling system. This system differs from that shown in Fig. 1 by the elimination of the rheostat 10 and by the substitution therefor of the following means.

A resistance 10 is inserted between the lines 7 and 8. A contact bar 18 is connected with the wire 8 for cooperation with slidable contact 11. When the movable contact 11 is located within the region between the lines 14 and 16 which denote torques of equal magnitude but opposite direction, the contact 11 will not contact the bar 18 and, therefore, the resistance 10 will be effective to reduce the current energizing the clutch 6 to a lower limit. This limit is so chosen that the clutch will slip when the torque transferred by the clutch exceeds the maximum coasting torque designated by line 14 or the driving torque designated by line 16. When the driving torque increases above that designated by line 16, however, the movable contact 11 engages the contact bar 18 and short-circuits the resistance 10 thereby conditioning the clutch 6 for transfer of its maximum torque which is slightly higher than the highest torque that can be produced by the engine 1.

The method described is capable of numerous modifications. Whereas in the system shown in Fig. 1 the critical slippage limit of the clutch 6 is controlled in a continuous manner by the measuring and detecting means 4, 12, such control may be effected stepwise for instance as shown in Fig. 2. In the stepwise controlling method described hereinabove with reference to Fig. 2 the critical clutch limit is settable to a maximum magnitude and to a minimum magnitude only.

While the invention has been described in connection with a number of different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. An apparatus for controlling a motor vehicle of the type having an engine geared to wheels of the vehicle and a clutch interposed therebetween, said clutch being of the type wherein the clutching limit is automatically adjustable in dependence on the actually available engine torque, said apparatus comprising means for detecting the direction of said torque, said direction depending on whether the engine drives the vehicle or is driven by the coasting vehicle, and means operatively connected with said detecting means for variably adjusting said limit between a maximum and a minimum as said torque acts in the driving direction.

2. An apparatus as claimed in claim 1 in which the maximum of said limit slightly exceeds the maximum driving torque and the minimum of said limit slightly exceeds the maximum coasting torque, said minimum of said limit being maintained at least for the entire duration of the coasting condition.

3. An apparatus for controlling a motor vehicle of the type having an engine geared to wheels of the vehicle and a clutch interposed therebetween, said clutch being of the type wherein the clutching limit is automatically adjustable in dependence on the engine torque, comprising means for continuously measuring the magnitude and the direction of said torque, said direction depending on whether the engine drives the vehicle or is driven by the coasting vehicle, and adjusting means operatively connected with said measuring means for continuously raising said limit as said driving torque increases and lowering said limit as said driving torque decreases.

4. An apparatus for controlling a motor vehicle of the type having an engine geared to the wheels of the vehicle and a clutch interposed therebetween, said clutch being of the type wherein the clutching limit is automatically adjustable in dependence on the actually available engine torque, said apparatus comprising means for measuring the magnitude and the direction of said torque, said direction depending on whether the engine drives the vehicle or is driven by the coasting vehicle, adjusting means operatively connected with said measuring means for lowering said limit to a predetermined lower magnitude when said torque acting in driving direction drops beneath an amount slightly lower than the maximum coasting torque, and raising said limit to an upper predetermined magnitude when said torque acting in a driving direction exceeds said amount.

5. In a motor vehicle, the combination comprising a driving system composed of an engine and of a train of power transferring elements gearing said engine to wheels of said vehicle and including a clutch of the type wherein the maximum amount of torque transmitted thereby is adjustable with the available engine torque within a predetermined range, including detecting means associated with said driving system and adapted to detect the direction of said torque which depends on whether the engine drives the vehicle or is driven by the coasting vehicle, and a movable element operatively connected with said detecting means for variably determining said adjustable maximum torque within said predetermined range.

6. In a motor vehicle, the combination comprising a driving system composed of an engine and of a train of power transferring elements gearing said engine to wheels of said vehicle and including a clutch of the type wherein the limit of clutching torque transmitted therethrough is automatically adjustable in dependence on the available engine torque comprising, measuring means associated with said driving system and adapted to measure the magnitude and the direction of said torque, and a movable element for continuously varying said adjustable limit at least during the driving condition of the vehicle and operatively connected to said measuring means for movement thereby to keep said limit above said engine torque throughout the range of variation of said limit.

7. The combination as claimed in claim 6 in which said movable element is operatively connected to said measuring means to adjust said limit to a maximum whenever said torque acts in the driving direction and exceeds an amount slightly lower than the maximum coasting torque.

8. The combination as claimed in claim 6 in which at least one element of said driving system is resiliently mounted in said vehicle for a displacement commensurate with said torque, said measuring means being responsive to said displacement.

References Cited in the file of this patent

UNITED STATES PATENTS

| | | |
|---|---|---|
| 1,701,189 | Mitchell | Feb. 5, 1929 |
| 2,407,022 | Lambert | Sept. 3, 1946 |
| 2,457,801 | Ball | Jan. 4, 1949 |
| 2,624,432 | Randol | Jan. 6, 1953 |
| 2,739,679 | Randol | Mar. 27, 1956 |